US006622234B1

(12) United States Patent
Pechanek et al.

(10) Patent No.: US 6,622,234 B1
(45) Date of Patent: Sep. 16, 2003

(54) METHODS AND APPARATUS FOR INITIATING AND RESYNCHRONIZING MULTI-CYCLE SIMD INSTRUCTIONS

(75) Inventors: Gerald G. Pechanek, Cary, NC (US); David Carl Strube, Raleigh, NC (US); Edward A. Wolff, Chapel Hill, NC (US); Edwin Frank Barry, Cary, NC (US); Grayson Morris, Durham, NC (US); Carl Donald Busboom, Cary, NC (US); Dale Edward Schneider, Durham, NC (US)

(73) Assignee: PTS Corporation, San Jose, CA (US)

( * ) Notice: Subject to any disclaimer, the term of this patent is extended or adjusted under 35 U.S.C. 154(b) by 622 days.

(21) Appl. No.: 09/598,564

(22) Filed: Jun. 21, 2000

Related U.S. Application Data

(60) Provisional application No. 60/140,162, filed on Jun. 21, 1999.

(51) Int. Cl.[7] .............................................. G06F 9/38
(52) U.S. Cl. ............................ 712/22; 712/24; 712/215
(58) Field of Search ............................ 712/22, 24, 215

(56) References Cited

U.S. PATENT DOCUMENTS

| | | | |
|---|---|---|---|
| 5,713,012 A | 1/1998 | Tanaka et al. | 395/580 |
| 5,822,578 A | 10/1998 | Frank et al. | 395/591 |
| 5,881,216 A | 3/1999 | Johnson | 395/182.13 |
| 6,014,736 A | 1/2000 | Elliott et al. | 712/216 |
| 6,366,998 B1 * | 4/2002 | Mohamed | 712/17 |

OTHER PUBLICATIONS

Hinton, et al., Microprocessor in Which Multiple Instructions are Executed in One Clock Cycle by Providing Separate Machine Bus Access to a Register File for Different Types of Instructions, Published Feb. 1, 1994.

* cited by examiner

*Primary Examiner*—William M. Treat
(74) *Attorney, Agent, or Firm*—Priest & Goldstein, PLLC

(57) ABSTRACT

Techniques for adding more complex instructions and their attendant multi-cycle execution units with a single instruction multiple data, stream (SIMD) very long instruction word (VLIW) processing framework are described. In one aspect, an initiation mechanism also acts as a resynchronization mechanism to read the results of multi-cycle execution. This multi-purpose mechanism operates with a short instruction word (SIW) issue of the multi-cycle instruction, in a sequence processor (SP) alone, with a VLIW, and across all processing elements (PEs) individually or as an array of PEs. A number of advantageous floating point instructions are also described.

15 Claims, 9 Drawing Sheets

FIG. 3A — 300

DIV ENCODING

| 31 30 | 29 | 28 27 | 26 25 24 23 22 21 | 20 19 18 17 16 | 15 14 13 12 11 | 10 9 8 7 6 | 5 4 3 | 2 1 0 |
|---|---|---|---|---|---|---|---|---|
| GROUP | S/P | UNIT | DSUopcode | Rt | Rx | Ry | DivExt | CE3 |

FIG. 3B — 310

DIV SYNTAX/OPERATION

| INSTRUCTION | OPERANDS | OPERATION | ACF |
|---|---|---|---|
| | | | WORD |
| DIV.[SP]D.1[SU]W | Rt, Rx, Ry | IN THE FIRST EXECUTION CYCLE:(1)<br>Rt ← CURRENT VALUE OF DSQR<br>C ← DC0 FROM SCR1<br>N ← DN0 FROM SCR1<br>V ← DV0 FROM SCR1<br>Z ← DZ0 FROM SCR1<br>AT THE END OF THE LAST CYCLE OF THE MULTI-CYCLE OPERATION<br>DSQR ← Rx/Ry<br>MODR ← REMAINDER OF Rx/Ry<br>DC0, DN0, DV0, AND DZ0 FIELDS IN THE SCR1 ← Rx/Ry<br>FLAGS GENERATED | NONE |
| DIV[CNVZ].[SP]D.1[SU]W | Rt, Rx, Ry | DO OPERATION ABOVE<br>IN THE FIRST EXECUTION CYCLE:(1)<br>F0 ← SPECIFIED DC0, DN0, DV0, OR DZ0 FLAG FROM SCR1 | F0 |
| [TF].FDIV.[SP]D.1[SU]W | Rt, Rx, Ry | DO OPERATION ONLY IF T/F CONDITION IS SATISFIED IN F0 | NONE |
| | | | DUAL HALFWORDS |
| DIV.[SP]D.1[SU]H | Rt, Rx, Ry | IN THE FIRST EXECUTION CYCLE:(1)<br>RtH1 ← CURRENT VALUE OF DSQRH1<br>RtH0 ← CURRENT VALUE OF DSQRH0<br>C ← DC0 FROM SCR1<br>N ← DN0 FROM SCR1<br>V ← DV0 FROM SCR1<br>Z ← DZ0 FROM SCR1<br>AT THE END OF THE LAST CYCLE OF THE MULTI-CYCLE OPERATION:<br>DSQRH1 ← RxH1/RyH1<br>DSQRH0 ← RxH0/RyH0<br>MODRH1 ← REMAINDER OF RxH1/RyH1<br>MODRH0 ← REMAINDER OF RxH0/RyH0<br>DC1, DN1, DV1, AND DZ1 FIELDS IN THE SCR1 ← RxH1/RyH1 FLAGS GENERATED<br>DC0, DN0, DV0, AND DZ0 FIELDS IN THE SCR1 ← RxH0/RyH0 FLAGS GENERATED | NONE |
| DIV[CNVZ].[SP]D.2[SU]H | Rt, Rx, Ry | DO OPERATION ABOVE<br>IN THE FIRST EXECUTION CYCLE:(1)<br>F1 ← SPECIFIED DC1, DN1, DV1, OR DZ1 FLAG FROM SCR1<br>F0 ← SPECIFIED DC0, DN0, DV0, OR DZ0 FLAG FROM SCR1 | F1-F0 |
| [TF].DIV.[SP]D.2[SU]H | Rt, Rx, Ry | DO OPERATION ONLY IF T/F CONDITION IS SATISFIED IN F0 | NONE |

FIG. 4A

FDIV ENCODING — 400

| 31 30 | 29 | 28 27 | 26 25 24 23 22 21 | 20 19 18 17 16 | 15 14 13 12 11 | 10 9 8 7 6 | 5 4 3 | 2 1 0 |
|---|---|---|---|---|---|---|---|---|
| GROUP | S/P | UNIT | DSUopcode | Rt | Rx | Ry | FdivExt | CE3 |

FIG. 4B — 410

FLOATING-POINT DIVISION OPERATIONS WITH ZERO, NAN AND INFINITY VALUES

| FLOATING-POINT OPERAND | | 2nd FLOATING-POINT OPERAND | | MANARRAY FLOATING-POINT RESULT | ARITHMETIC FLAGS |
|---|---|---|---|---|---|
| SIGN | VALUE | SIGN | VALUE | | |
| 0 | NAN OR INF | 0 | NON-ZERO | $+1.9999\ldots \times 2^{127}$ | V=1, N=0, Z=0 |
| 0 | NAN OR INF | 1 | NON-ZERO | $-1.9999\ldots \times 2^{127}$ | V=1, N=1, Z=0 |
| 0 | NAN OR INF | 0/1 | ZERO | $+1.9999\ldots \times 2^{127}$ | V=1, N=0, Z=0 |
| 0 | NAN OR INF | 0 | NAN OR INF | 1 | V=1, Z=0, N=0 |
| 0 | NAN OR INF | 1 | NAN OR INF | -1 | V=1, Z=0, N=1 |
| 1 | NAN OR INF | 0 | NON-ZERO | $-1.9999\ldots \times 2^{127}$ | V=1, N=1, Z=0 |
| 1 | NAN OR INF | 1 | NON-ZERO | $+1.9999\ldots \times 2^{127}$ | V=1, N=0, Z=0 |
| 1 | NAN OR INF | 0/1 | ZERO | $-1.9999\ldots \times 2^{127}$ | V=1, N=1, Z=0 |
| 1 | NAN OR INF | 0 | NAN OR INF | -1 | V=1, Z=0, N=1 |
| 1 | NAN OR INF | 1 | NAN OR INF | 1 | V=1, Z=0, N=0 |
| 0 | NON-ZERO | 0 | NAN OR INF | +0 | V=1, N=0, Z=1 |
| 0 | NON-ZERO | 1 | NAN OR INF | +0 | V=1, N=0, Z=1 |
| 0 | NON-ZERO | 0/1 | ZERO | $+1.9999\ldots \times 2^{127}$ | V=1, N=0, Z=0 |
| 1 | NON-ZERO | 0 | NAN OR INF | +0 | V=1, N=0, Z=1 |
| 1 | NON-ZERO | 1 | NAN OR INF | +0 | V=1, N=0, Z=1 |
| 1 | NON-ZERO | 0/1 | ZERO | $-1.9999\ldots \times 2^{-27}$ | V=1, N=1, Z=0 |
| 0/1 | ZERO | 0 | NAN OR INF | +0 | V=1, N=0, Z=1 |
| 0/1 | ZERO | 1 | NAN OR INF | +0 | V=1, N=0, Z=1 |
| 0/1 | ZERO | 0/1 | ZERO | +0 | V=1, N=0, Z=1 |
| A NON-NORMALIZED RESULT OF AN OPERATION IS FLUSHED TO ZERO | | | | | |

FIG. 4C

FDIV SYNTAX/OPERATION

| INSTRUCTION | OPERANDS | OPERATION | ACF |
|---|---|---|---|
| FDIV.[SP]D.1FW | Rt, Rx, Ry | IN THE FIRST EXECUTION CYCLE:[1]<br>Rt ← CURRENT VALUE OF DSQR<br>C FLAG ← DCO FROM THE SCR1<br>N FLAG ← DNO FROM THE SCR1<br>V FLAG ← DVO FROM THE SCR1<br>Z FLAG ← DZO FROM THE SCR1<br>AT THE END OF THE LAST CYCLE OF THE MULTI-CYCLE OPERATION:<br>DSQR ← Rx/Ry<br>DDO, DNO, DVO, AND DZO FIELDS IN THE SCR1 ← FLAGS GENERATED | NONE |
| FDIV[CNVZ].[SP]D.1FW | Rt, Rx, Ry | DO OPERATION ABOVE<br>IN THE FIRST EXECUTION CYCLE:<br>SET THE CNVZ FLAGS AS ABOVE, THEN<br>F0 ACF FLAG ← THE SPECIFIED CNVZ FLAG | F0 |
| [TF].FDIV.[SP]D.1FW | Rt, Rx, Ry | DO OPERATION ONLY IF T/F CONDITION IS SATISFIED IN F0 | NONE |

FSQRT ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | DSUopcode | | | | | | Rt | | | | | Rx | | | | | 0 | 0 | 0 | 0 | 0 | | FsqrtExt | | | CE3 | |

FSQRT SYNTAX/OPERATION

| INSTRUCTION | OPERANDS | OPERATION | ACF |
|---|---|---|---|
| FSQRT.[SP]D.1FW | Rt, Rx | IN THE FIRST EXECUTION CYCLE:(1)<br>Rt ← CURRENT VALUE OF DSQR<br>C FLAG ← DCO FLAG FIELD FROM THE SCR1<br>N FLAG ← DNO FLAG FIELD FROM THE SCR1<br>V FLAG ← DVO FLAG FIELD FROM THE SCR1<br>Z FLAG ← DZO FLAG FIELD FROM THE SCR1 ─── FLAGS GENERATED<br>AT THE END OF THE LAST CYCLE OF THE MULTI-CYCLE OPERATION:<br>DSQR ← Rx$^{1/2}$<br>DD0, DN0, DV0, AND DZ0 FIELDS IN THE SCR1 | NONE |
| FSQRT[CNVZ].[SP]D.1FW | Rt, Rx | DO OPERATION ABOVE<br>IN THE FIRST EXECUTION CYCLE:(1)<br>SET THE CNVZ FLAGS AS ABOVE, THEN<br>F0 ACF FLAG ← THE SPECIFIED CNVZ FLAG | F0 |
| [TF].FSQRT.[SP]D.1FW | Rt, Rx | DO OPERATION ONLY IF SPECIFIED CONDITION IS SATISFIED IN F0 | NONE |

FRCP ENCODING

600

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | DSUopcode | | | | | | | Rt | | | | | | | | | 0 | 0 | 0 | 0 | 0 | FdivExt | | | CE3 | | |

FIG. 6B

FRCP SYNTAX/OPERATION

610

| INSTRUCTION | OPERANDS | OPERATION | ACF |
|---|---|---|---|
| FRCP.[S\|P]D.1FW | Rt, Rx | IN THE FIRST EXECUTION CYCLE:(1)<br>Rt ← CURRENT VALUE OF DSQR<br>C FLAG ← DCO FLAG FIELD FROM THE SCR1<br>N FLAG ← DNO FLAG FIELD FROM THE SCR1<br>V FLAG ← DVO FLAG FIELD FROM THE SCR1<br>Z FLAG ← DZO FLAG FIELD FROM THE SCR1 — FLAGS GENERATED<br>AT THE END OF THE LAST CYCLE OF THE MULTI-CYCLE OPERATION:<br>DSQR ← 1/Rx<br>DDO, DNO, DVO, AND DZO FIELDS IN THE SCR1 | NONE |
| FCRP[CNVZ].[SP]D.1FW | Rt, Rx | DO OPERATION ABOVE<br>IN THE FIRST EXECUTION CYCLE:(1)<br>SET THE CNVZ FLAGS AS ABOVE, THEN<br>F0 ACF FLAG ← THE SPECIFIED CNVZ FLAG | F0 |
| [TF].FRCP.[SP]D.1FW | Rt, Rx | DO OPERATION ONLY IF T/F CONDITION IS SATISFIED IN F0 | NONE |

FIG. 7A

FRSQRT ENCODING — 700

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | | DSUopcode | | | | | | Rt | | | | | | Rx | | | 0 | 0 | 0 | 0 | 0 | 0 | FsqrtExt | | | CE3 | | |

FIG. 7B

FRSQRT SYNTAX/OPERATION — 710

| INSTRUCTION | OPERANDS | OPERATION | ACF |
|---|---|---|---|
| FRSQRT.[SP]D.1FW | Rt, Rx | IN THE FIRST EXECUTION CYCLE:$^{(1)}$<br>Rt ← CURRENT VALUE OF DSQR<br>C FLAG ← DC0 FLAG FIELD FROM THE SCR1<br>N FLAG ← DN0 FLAG FIELD FROM THE SCR1<br>V FLAG ← DV0 FLAG FIELD FROM THE SCR1<br>Z FLAG ← DZ0 FLAG FIELD FROM THE SCR1<br>AT THE END OF THE LAST CYCLE OF THE MULTI-CYCLE OPERATION:<br>DSQR ← 1/Rx$^{1/2}$<br>DD0, DN0, DV0, AND DZ0 FIELDS IN THE SCR1 ← FLAGS GENERATED | NONE |
| FRSQRT[CNVZ].[SP]D.1FW | Rt, Rx | DO OPERATION ABOVE<br>IN THE FIRST EXECUTION CYCLE:$^{(1)}$<br>SET THE CNVZ FLAGS AS ABOVE. THEN<br>F0 ACF FLAG ← THE SPECIFIED CNVZ FLAG | F0 |
| [TF].FRSQRT.[SP]D.1FW | Rt, Rx | DO OPERATION ONLY IF SPECIFIED CONDITION IS SATISFIED IN F0 | NONE |

FIG. 8

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| S | \multicolumn{8}{c}{EXPONENT (e)} | | | | | | | | | \multicolumn{23}{c}{FRACTION} | | | | | | | | | | | | | | | | | | | | |
| MSB | | | | | | | LSB | MSB | | | | | | | | | | | | | | | | | | | | | | | LSB |

WHERE:

S = 0 = POSITIVE VALUE, 1 = NEGATIVE VALUE.

EXPONENT (e) = EXPONENT VALUE BIASED BY + 127 SUCH THAT e = E + 127

FRACTIONAL = FRACTIONAL VALUE

PRECISION = 24 BITS

MSB = MOST SIGNIFICANT BIT

LSB = LEAST SIGNIFICANT BIT

AND:

| | VALUE | REPRESENTS AN EXPONENT |
|---|---|---|
| $E_{MAX}$ | 127 | 1111 1110 |
| $E_{MIN}$ | -126 | 0000 0001 |
| $E_{MAX}+1$ | | 1111 1111 |
| $E_{MIN}-1$ | | 0000 0000 |
| EXPONENT BIAS | 127 | |

800

METHODS AND APPARATUS FOR INITIATING AND RESYNCHRONIZING MULTI-CYCLE SIMD INSTRUCTIONS

RELATED APPLICATIONS

The present invention claims the benefit of U.S. Provisional Application Serial No. 60/140,162 entitled "Methods and Apparatus for Initiating and Resynchronizing Multi-Cycle SIMD Instructions" and filed Jun. 21, 1999 which is incorporated by reference herein in its entirety.

FIELD OF THE INVENTION

The present invention relates generally to improved array processing using multi-cycle execution units in a single instruction multiple data stream (SIMD) very long instruction word (VLIW) array processor.

BACKGROUND OF THE INVENTION

In an architecture, such as the manifold array (ManArray) processor, VLIWs are created from multiple short instruction words (SIWs), stored in a VLIW memory (VIM), and executed by an SIW execute VLIW (XV) instruction. The pipeline used in the processor is a dynamically reconfigured pipeline which supports a distributed VIM in each of the processing elements (PEs) in the array processor. See, for example, "Methods and Apparatus to Dynamically Reconfigure the Instruction Pipeline of An Indirect Very Long Instruction Word Scalable Processor" U.S. patent application Ser. No. 09/228,374 filed Jan. 12, 1999, now U.S. Pat. No. 6,203,328, and incorporated by reference herein in its entirety.

The execution phase of the pipeline is relatively simple consisting of either single or dual execution cycles depending upon the instruction. This pipeline works fine for relatively simple instruction types, but has certain limitations in its support of more complex instructions which cannot complete their execution within a two-cycle maximum limit specified by an initial ManArray implementation. A VLIW processor, having variable execution periods can cause undesirable complexities for both implementation and for programming. It thus became desirable to solve the problem of how to add more complex instruction types in a SIMD array indirect VLIW processor such as the ManArray processor to support the evolution of this processor to a further range of applications.

SUMMARY OF THE INVENTION

The present invention describes advantageous techniques for adding more complex instructions and their consequent greater than 2-cycle multi-cycle execution units within a SIMD VLIW framework. Each PE in the array processor supports the technique and a single XV instruction can initiate several multi-cycle instructions to begin execution. In one aspect, the invention employs an initiation mechanism to also act as a resynchronization mechanism to read the results of the greater than 2-cycle multi-cycle execution. This multi-purpose mechanism operates with an SIW issue of the multi-cycle instruction, in the sequence processor (SP) alone, within a VLIW, and across all PEs individually or as an array of PEs. In addition, the multi-cycle instruction is an SIW which can be encapsulated within a VLIW and loaded indirectly with a load VLIW (LV) instruction and cause its execution to begin with an XV instruction.

The multi-cycle instruction, which by definition takes greater than 2-cycles to complete, is allowed to execute within one of the existing execution unit modules, but independently of the other module SIW instructions. The results of the multi-cycle instruction are stored in a separate storage register at completion of its operation. This approach is different than the normal single or dual execution cycle instructions that write their result data to the compute register file (CRF) at completion of the execution cycle. Upon receipt of the next multi-cycle SIW in the SP or any PE, whether it be in a VLIW or to be executed as an SIW, the contents of the multi-cycle instruction result register are transferred to the target register specified in the multi-cycle SIW. This approach allows complex execution units supporting different numbers of execution cycles to coexist within the same execution unit and within the same programming model. For example, a divide and square root unit, supporting multiple instruction types, is used in the SP and each PE in the ManArray processor with the following execution latencies for an exemplary implementation:

dual 16-bit Integer Divide - - - 6-cycles 32-bit Integer Divide - - - 10-cycles

Single Precision Floating Point Divide - - - 8-cycles

Single Precision Floating Point Reciprocal - - - 8-cycles

Single Precision - - - 8-cycles

Single Precision Floating Point Reciprocal Square Root - - - 16-cycles For implementation reasons, the divide square root unit takes the indicated number of execution unit cycles to complete before another divide and square root type of instruction can be issued to the unit. In one aspect of the present invention, the programming model takes the execution latencies into account when scheduling new instruction dispatching. The divide square root unit instructions are all advantageously implemented in a single execution module within a data select unit (DSU) as addressed further below, but the technique outlined is not limited to this design approach. More generally, in accordance with the present invention, a complex multi-cycle instruction can be instantiated within any of the VLIW execution unit slots.

These and other features, aspects and advantages of the invention will be apparent to those skilled in the art from the following detailed description taken together with the accompanying drawings.

BRIEF DESCRIPTION OF THE DRAWINGS

FIGS. 3 A and B illustrate an integer divide instruction encoding and syntax and operation descriptions in accordance with the present invention;

FIGS. 4A, B, and C illustrate aspects of a floating point divide instruction encoding, a floating point operations table, and a syntax and operation description for a floating point divide instruction in accordance with the present invention;

FIGS. 5A and B illustrate aspects of a floating point square root instruction encoding and a syntax and operation description in accordance with the present invention;

FIGS. 6A and B illustrate aspects of a floating point reciprocal instruction encoding and syntax and operation description for that instruction in accordance with the present invention;

FIGS. 7A and B illustrate aspects of a floating point reciprocal square root encoding and syntax and operation description for such an instruction in accordance with the present invention; and FIG. 8 shows a floating point format table of a floating point format suitable for use in conjunction with the present invention.

DETAILED DESCRIPTION

Figure 1:
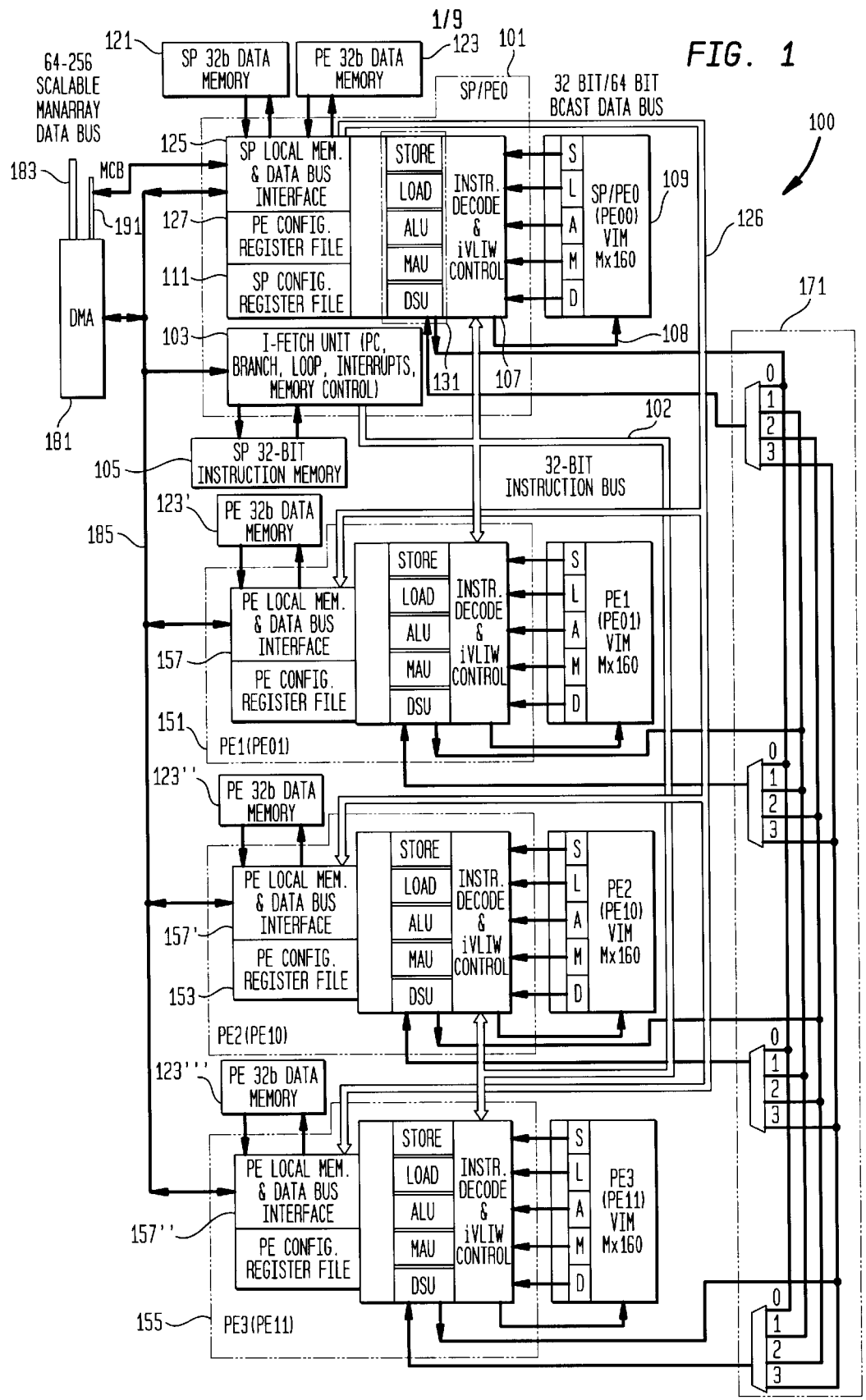
FIG. 1 illustrates an exemplary 2×2 ManArray iVLIW processor suitable for use in conjunction with the present invention.

Further details of a presently preferred ManArray core, architecture, and instructions for use in conjunction with the present invention are found in U.S. patent application Ser. No. 08/885,310 filed Jun. 30, 1997, now U.S. Pat. No. 6, 023,753, U.S. patent application Ser. No. 08/949,122 filed Oct. 10, 1997, now U.S. Pat. No. 6,167,502, U.S. patent application Ser. No. 09/169, 255 filed Oct. 9, 1998, now U.S. Pat. No. 6,343,356, U.S. patent application Ser. No. 09/169, 256 filed Oct. 9, 1998, now U.S. Pat. No. 6,167,501, U.S. patent application Ser. No. 09/169,072 filed Oct. 9, 1998, now U.S. Pat. No. 6,219,776, U.S. patent application Ser. No. 09/187,539 filed Nov. 6, 1998, now U.S. Pat. No. 6,151,668, U.S. patent application Ser. No. 09/205,558 filed Dec. 4, 1998, now U.S. Pat. No. 6,279,060, U.S. patent application Ser. No. 09/215,081 filed Dec. 18, 1998, now U.S. Pat. No. 6,101,592, U.S. patent application Ser. No. 09/228, 374 filed Jan. 12, 1999 and entitled "Methods and Apparatus to Dynamically Reconfigure the Instruction Pipeline of an Indirect Very Long Instruction Word Scalable Processor", now U.S. Pat. No. 6,216,223, U.S. patent application Ser. No. 09/238,446 filed Jan. 28, 1999, now U.S. Pat. No. 6,366,999, U.S. patent application Ser. No.! 09/267,570 filed Mar. 12, 1999, now U.S. Pat. No. 6,446,190, U.S. patent application Ser. No. 09/337,839 filed Jun. 22, 1999, U.S. patent application Ser. No. 09/350,191 filed July 9, 1999, now U.S. Pat. No. 6,356,994, U.S. patent application Ser. No. 09/422,015 filed Oct. 21, 1999 entitled "Methods and Apparatus for Abbreviated Instruction and Configurable Processor Architecture", now U.S. Pat. No. 6,408,382, U.S. patent application Ser. No. 09/432,705 filed Nov. 2, 1999 entitled "Methods and Apparatus for Improved Motion Estimation for Video Encoding", U.S. patent application Ser. No. 09/471,217 filed Dec. 23, 1999 entitled "Methods and Apparatus for Providing Data Transfer Control", now U.S. Pat. No. 6,260,082, U.S. patent application Ser. No. 09/472, 372 filed Dec. 23, 1999 entitled "Methods and Apparatus for Providing Direct Memory Access Control", U.S. patent application Ser. No. 09/996,103 entitled "Methods and Apparatus for Data Dependent Address Operations and Efficient Variable Length Code Decoding in a VLIW Processor" filed Jun. 16, 2000, now U.S. Pat. No. 6,397,324 , U.S. patent application Ser. No. 09/598,567 entitled "Methods and Apparatus for Improved Efficiency in Pipeline Simulation and Emulation" filed Jun. 21, 2000, U.S. patent application Ser. No. 09/598,566 entitled "Methods and Apparatus for Generalized Event Detection and Action Specification in a Processor" filed Jun. 21, 2000, U.S. Provisional Application Serial No. 60/140,224 entitled "Methods and Apparatus for Providing Manifold Array (ManArray) Program Context Switch with Array Reconfiguration Control" filed Jun. 21, 2000, and U.S. patent application Ser. No. 09/598,084 entitled "Methods and Apparatus for Establishing Port Priority Functions in a VLIW Processor" filed Jun. 21, 2000, as well as, Provisional Application Serial No. 60/113,637 entitled "Methods and Apparatus for Providing Direct Memory Access (DMA) Engine" filed Dec. 23, 1998, Provisional Application Serial No. 60/113,555 entitled "Methods and Apparatus Providing Transfer Control" filed Dec. 23, 1998, Provisional Application Serial No. 60/139,946 entitled "Methods and Apparatus for Data Dependent Address Operations and Efficient Variable Length Code Decoding in a VLIW Processor" filed Jun. 18, 1999, Provisional Application Serial No. 60/140,245 entitled "Methods and Apparatus for Generalized Event Detection and Action Specification in a Processor" filed Jun. 21, 1999, Provisional Application Serial No. 60/140,163 entitled "Methods and Apparatus for Improved Efficiency in Pipeline Simulation and Emulation" filed Jun. 21, 1999, Provisional Application Serial No. 60/140,162 entitled "Methods and Apparatus for Initiating and Re-Synchronizing Multi-Cycle SIMD Instructions" filed Jun. 21, 1999, Provisional Application Ser. No. 60/140,244 entitled "Methods and Apparatus for Providing One-By-One Manifold Array (1×1 ManArray) Program Context Control" filed Jun. 21, 1999, Provisional Application Ser. No. 60/140,325 entitled "Methods and Apparatus for Establishing Port Priority Function in a VLIW Processor" filed Jun. 21, 1999, Provisional Application Serial No. 60/140,425 entitled "Methods and Apparatus for Parallel Processing Utilizing a Manifold Array (ManArray) Architecture and Instruction Syntax" filed Jun. 22, 1999, Provisional Application Serial No. 60/165,337 entitled "Efficient Cosine Transform Implementations on the ManArray Architecture" filed Nov. 12, 1999, and Provisional Application Serial No. 60/171,911 entitled "Methods and Apparatus for DMA Loading of Very Long Instruction Word Memory"filed Dec. 23, 1999, Provisional Application Serial No. 60/184,668 entitled "Methods and Apparatus for Providing Bit-Reversal and Multicast Functions Utilizing DMA Controller" filed Feb. 24, 2000, Provisional Application Serial No. 60/184,529 entitled "Methods and Apparatus for Scalable Array Processor Interrupt Detection and Response" filed Feb. 24, 2000, Provisional Application Serial No. 60/184,560 entitled "Methods and Apparatus for Flexible Strength Coprocessing Interface" filed Feb. 24, 2000, and Provisional Application Serial No. 60/203,629 entitled "Methods and Apparatus for Power Control in a Scalable Array of Processor Elements" filed May 12, 2000, respectively, all of.which are assigned to the assignee of the present invention and incorporated by reference herein in their entirety.

In a presently preferred embodiment of the present invention, a ManArray 2×2 iVLIW single instruction multiple data stream (SIMD) processor 100 shown in FIG. 1 contains a controller sequence processor (SP) combined with processing element-0 (PE0) SP/PE0 101, as described in further detail in U.S. application Ser. No. 09/169,072 entitled "Methods and Apparatus for Dynamically Merging an Array Controller with an Array Processing Element", now U.S. Pat. No. 6,219,776. Three additional PEs 151,153, and 155 are also utilized to demonstrate initiating and resynchronizing multi-cycle SIMD instructions in accordance with the present invention. It is noted that the PEs can also be labeled with their matrix positions as shown in parentheses for PE0 (PE00) 101,PE1 (PE01) 151,PE2 (PE10)153, and PE3 (PE11) 155 . The combined SP/PE0 101 contains a fetch controller 103 to allow the fetching of short instruction words (SIWs) from a 32-bit instruction memory 105.The fetch controller 103 provides the typical functions needed in a programmable processor such as a program counter (PC),branch capability,digital signal processing loop operations,and support for interrupts. It also provides instruction memory management control which could include an instruction cache if needed by an application. In addition, the SIW I-Fetch controller 103 dispatches 32-bit SIWs to the other PEs in the system by means of a 32-bit instruction bus 102.

In this exemplary system, common elements are used throughout to simplify the explanation, though actual implementations are not so limited. By way of example, the execution units 131 in the combined SP/PE0 101 can be separated into a set of execution units optimized for a particular control function, for example, fixed point execution units, and the PE0 as well as the other PEs 151, 153 and 155 can be optimized for a floating point application. For the purposes of this description, it is assumed that the execution units 131 are of the same type in the SP/PE0 and the other PEs. In a similar manner, SP/PE0 and the other PEs use a five instruction slot iVLIW architecture which contains a very long instruction word memory (VIM) 109 and an instruction decode and VIM controller function unit 107 which receives instructions as dispatched from the SP/PE0's I-Fetch unit 103 and generates the VIM addresses-and-control signals 108 required to access the iVLIWs stored in the VIM. These iVLIWs are identified by the letters SLAMD in VIM 109. The loading of the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register file 127 which is described in further detail in U.S. patent application Ser. No. 09/169,255 entitled "Methods and Apparatus for Dynamic Instruction Controlled Reconfiguration Register File with Extended Precision".

Due to the combined nature of the SP/PE0, the data memory interface controller 125 must handle the data processing needs of both the SPi controller, with SP data in memory 121, and PE0, with PE0 data in memory 123. The SP/PE0 controller 125 also is the source of the data that is sent over the 32-bit or 64-bit broadcast data bus 126. The other PEs 151, 153, and 155 contain common physical data memory units 123', 123", and 123''' though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171, various presently preferred aspects of which are described in greater detail in U.S. Pat. No. 6,023,753 entitled "Manifold Array Processor", U.S. application Ser. No. 09/949,122 entitled "Methods and Apparatus for Manifold Array Processing", and U.S. application Ser. No. 09/169,256 entitled "Methods and Apparatus for ManArray PE-to-PE Switch Control". The interface to a host processor, other peripheral devices, and/or external memory can be done in many ways. A primary presently preferred mechanism shown for completeness is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray Control Bus (MCB) 191 is also shown.

All of the above noted patents and applications are assigned to the assignee of the present invention and incorporated herein by reference in their entirety.

Turning now to specific details of the ManArray processor apparatus as adapted by the present invention, the inventive approach advantageously provides efficient implementation of more complex instructions and their multi-cycle execution units as described further below.

Figure 2A:
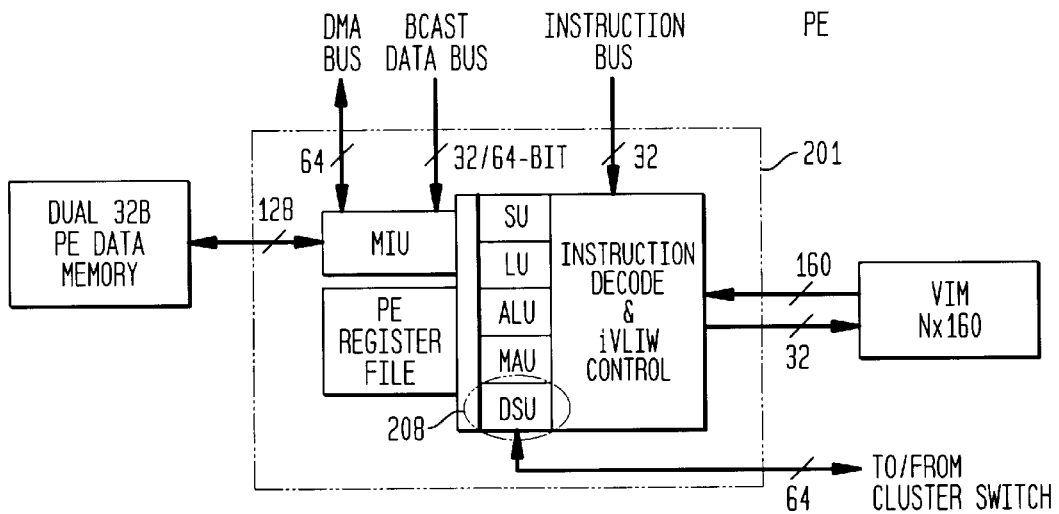
FIG. 2A illustrates further details of one of the PEs of FIG. 1.
Figure 2B:
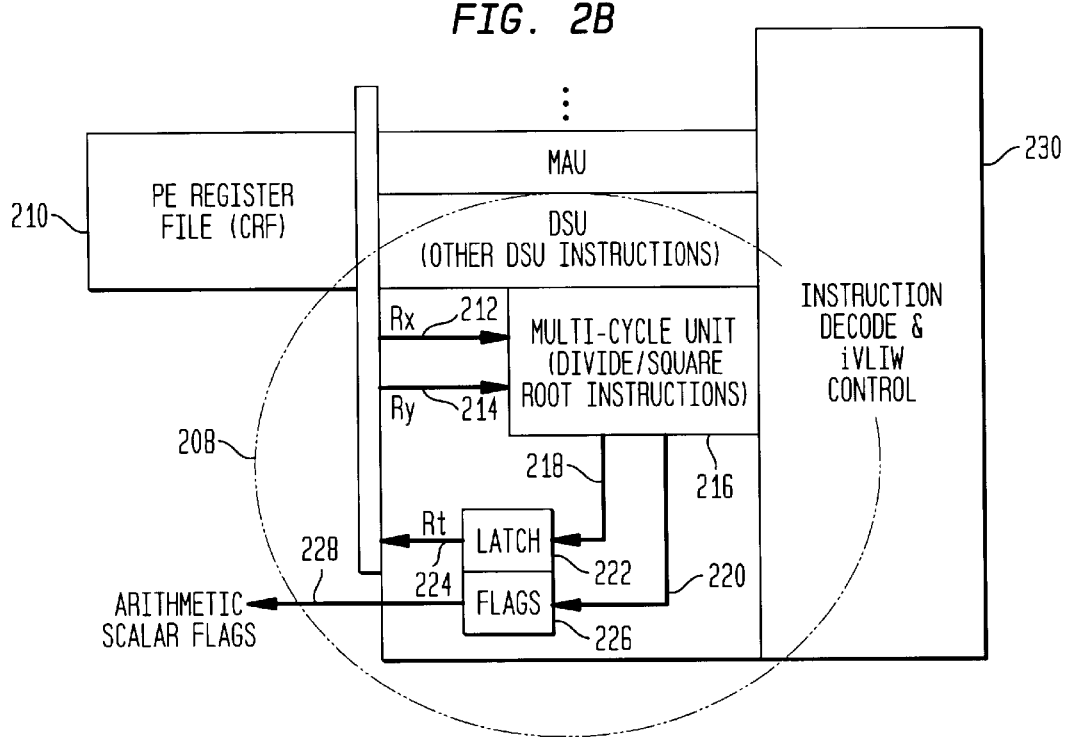
FIG. 2B illustrates an exemplary complex instruction divide/square root module operative in the DSU of the PEs of FIG. 1 suitable for use in the present invention.

FIG. 2A illustrates further details of a PE 201 suitable for use as one or more of the PEs of FIG. 1. FIG. 2B illustrates further aspects of a multi-cycle execution unit 216, specifically a divide and square root unit, incorporated in the DSU 208. The execution units read source operands from the CRF 210 and write results to the CRF 210. Such reading and writing is illustrated in FIG. 2B for the multi-cycle execution unit 216. As shown in FIG. 2B, execution unit 216 has source operand read paths Rx 212 and Ry 214. It also includes a result operand register 222 that holds results 218 and flag register 226. Flag register 226 holds the flags produced at output 220 of the multi-cycle execution unit 216 at the completion of the multi-cycle operation. It is noted that the source operands can be either 32-bits or 64-bits due to the ManArray reconfigurable register file design, and that in general other operand widths are not precluded. Flag register 226 is advantageously implemented as part of a status and control register (SCRI) that is part of a ManArray's miscellaneous register file (MRF). For the divide square root unit, the outputs of the result operand register, divide square root register (DSQR) 224 are stored in the CRF while the outputs of the flag register DC0, DN0, DV0, and DZ0 228 are stored as the CNVZ arithmetic scalar flags. In some cases, an additional result register, such as a register for storing the result of an integer remainder (MOD) instruction results in a remainder of a division operation described further below, is also utilized. A multi-cycle execution unit can be conditionally executed based upon the state of the condition flags that are checked in the initialization and resynchronization cycle of a multi-cycle instruction. In addition, if a multi-cycle instruction is issued prior to completion of the specified number of multi-cycle operations, then the multi-cycle unit stops execution of the previous instruction and initializes and resynchronizes to start the newly received multi-cycle instruction. The specific operation of the multi-cycle execution unit is described in further detail below for each of the exemplary instructions: integer divide (DIV), floating point divide (FDIV), floating point square root (FSQRT), floating point reciprocal (FCRP), and floating point reciprocal square root (FRSQRT).

Integer Divide

FIG. 3A illustrates a presenting preferred encoding format for an integer divide (DIV) instruction 300 in accordance with the present invention. FIG. 3B shows a syntax and operation table 310 for the DIV instruction 300 providing further details of its operation in accordance with the present invention. It is noted that in the first execution cycle for the syntax/operation 310 of FIG. 3B, the CNVZ flags and F0-F1 ACF flags are made available to the next instruction in the pipeline, but are actually written to SCR0 on the second execution cycle. This operation is similar to how all single-cycle arithmetic instructions operate. Additionally, the following table lists the arithmetic scalar flags affected during execution:

| | |
|---|---|
| N = | DN0 from SCR1 |
| Z = | DZ0 from SCR1 |
| V = | DV0 from SCR1 |
| C = | DC0 from SCR1 |
| DNx = | MSB of quotient |
| DZx = | 1 if quotient is zero, 0 otherwise |
| DVx = | 1 if quotient is saturated, 0 otherwise |
| DCx = | 1 if remainder is zero, 0 otherwise |

Further, the DIV instruction 300 takes 10 cycles to complete operation for a 32-bit word, and 6 cycles for a 16-bit dual halfword.

Execution of DIV instruction 300 by a PE, such as PE 201 of FIG. 2A may be summarized as follows: the result of a previously executed divide/square root unit instruction is copied from the DSQR 222 into the target CRF register and the saved divide arithmetic scalar flags 226 are copied from the DC0, DN0, DV0, and DZ0 fields in the SCRI to the CNVZ arithmetic scalar flags in SCR0. The source operands are issued to the divide/square root module 216 in DSU 208 to produce an integer division quotient and a truncated remainder after a multi-cycle iteration. When the result is complete, the quotient is placed in DSQR 222, the truncated remainder is placed in the MODR, another register "latch" similar to DSQR 222, and the arithmetic flags generated are saved in the DCx, DNx, DVx, and DZx fields of the SCR1. The quotient results and arithmetic flags can be obtained by issuing another divide/square root instruction in the same PE or SP (see DSQR instruction example below for further details), or the results alone can be obtained by copying the DSQR or the MODR to a CRF register via a copy instruction (COPY). The copy instruction does not initiate or resynchronize a new multi-cycle operation. The MOD instruction produces an integer remainder is also used in the ManArray processor. The MODR or DSQR values are returned dependent upon the initiating and resynchronizing SIW. The function is further defined for corner cases of Rx/Ry as follows:

| | Rx | Ry | DSQR | MODR | Flags |
|---|---|---|---|---|---|
| Signed | + non-zero | 0 | max pos | 0 | C = 1, N = 0, V = 1, Z = 0 |
| | − non-zero | 0 | max neg | 0 | C = 1, N = 1, V = 1, Z = 0 |
| | 0 | 0 | 0 | 0 | C = 1, N = 0, V = 1, Z = 1 |
| Unsigned | non-zero | 0 | max # | 0 | C = 1, N = 1, V = 1, Z = 0 |
| | 0 | 0 | 0 | 0 | C = 1, N = 0, V = 1, Z = 1 |

EXAMPLE

!To obtain R2=R0/R1

DIV.PD.1SW R3, R0, R1 ! Cycle-1,R3 gets DSQR result, divide unit begins on R0/R1

| | |
|---|---|
| <instr2> | ! Cycle-2 of DIV |
| <instr3> | ! Cycle-3 of DIV |
| <instr4> | ! Cycle-4 of DIV |
| <instr5> | ! Cycle-5 of DIV |
| <instr6> | ! Cycle-6 of DIV |
| <instr7> | ! Cycle-7 of DIV |
| <instr8> | ! Cycle-8 of DIV |
| <instr9> | ! Cycle-9 of DIV |
| <instr10> | ! Cycle-10 of DIV, DSQR/MODR gets result at the end of this cycle |

DIV.PD.1SW R2, R3, R4 ! R2 gets DSQR(DIV R0/R1), divide unit begins on R3/R4

It is noted that the instructions, <instr2> through<instr10>, represent independent concurrently executing instructions in the DSU, where the multi-cycle execution unit is also located, that operate while the multi-cycle execution is occurring.

Floating Point Divide

FIGS. 4A, 4B and 4C illustrate aspects of a presently preferred encoding of a floating point divide (FDIV) instruction 400, a floating point division operations table 410, and a syntax and operation table 420, respectively. For instruction 400, it is noted that in the first execution cycle the CNVZ flags and F0-F1 ACF flags are made available to the next instruction in the pipeline, but are actually written to SCR0 on the second execution cycle. Again, this operation is similar to how all single-cycle arithmetic instructions operate. The table which follows below lists the arithmetic scalar flags affected during execution of FDIV 400:

| | |
|---|---|
| N = | Current DN0 field from the SCR1. |
| Z = | Current DZ0 field from the SCR1. |
| V = | Current DV0 field from the SCR1. |
| C = | Current DC0 field from the SCR1. |
| DN = | MSB of multi-cycle result. |
| DZx = | 1 if a zero from multi-cycle result is generated, 0 otherwise. |
| DVx = | 1 if a saturate from multi-cycle result is generated, 0 otherwise. |
| DCx = | Not Affected. |

This execution takes 8 cycles.

Operation in accordance with the present invention may be illustrated as follows. In the first execution cycle of FDIV, the result of a previously executed divide/square root unit instruction is copied from the DSQR 222 into the target register and the saved flags are copied from the DC, DN, DV, and DZ fields in the SCRI to the CNVZ arithmetic flags in SCR0. The source operands are issued to the divide/square root module 216 in DSU 210 to produce a floating point division quotient after a multi-cycle iteration. When the result is complete, it is placed in DSQR 222, and the arithmetic flags generated are saved in the DC, DN, DV, and DZ fields of the SCR1. The results and arithmetic flags can be obtained by issuing another divide/square root instruction to divide/square root module 216 in the same PE or SP (see the DSQR instruction examples below for further details), or the results alone can be obtained by copying the DSQR to a compute register via a copy instruction (COPY). The copy instruction does not initiate or resynchronize a new multi-cycle operation. Both source registers are assumed to be in IEEE 754 compatible floating point format. The instruction 400 produces floating point (FP) results compatible with the IEEE 754 standard. For additional discussion of ManArray floating point operations, see the further discussions of floating point operations saturation, and overflow below. The instruction 400 executes in the DSU functional unit 210. The floating-point division operation table 410 of FIG. 4B illustrates operation with zero, NAN and infinity values. The following FDIV example serves to further illustrate various aspects of operation in accordance with the present invention.

FDIV EXAMPLE
!To obtain R2=R0/R1
   FDIV.PD.1FW R3, R0, R1 ! Cycle-1,R3 gets DSQR result, divide unit begins on R0/R1

| | |
|---|---|
| <instr2> | ! Cycle-2 of FDIV |
| <instr3> | ! Cycle-3 of FDIV |
| <instr4> | ! Cycle-4 of FDIV |
| <instr5> | ! Cycle-5 of FDIV |
| <instr6> | ! Cycle-6 of FDIV |
| <instr7> | ! Cycle-7 of FDIV |
| <instr8> | ! Cycle-8 of FDIV, DSQR/MODR gets result at the end of this cycle |

FDIV.PD.1FW R2, R3, R4 ! R2 gets DSQR (FDIV R0/R1), divide unit begins on R3/R4

It is noted that the instructions, <instr2> through <instr8> above, represent independent concurrently executing instructions that operate while the multi-cycle execution is occurring.

FIGS. 5A and 5B illustrate aspects of a presently preferred encoding of a floating point square root (FSQRT) instruction 500 and a syntax and operation table 510, respectively. It is noted for the instruction 500 that in the first cycle of execution the CNVZ flags and F0-F1 ACF flags are made available to the next instruction in the pipeline, but are actually written to SCR0 on the second execution cycle. This operation is similar to how all ManArray single-cycle arithmetic instructions operate. It is further noted that the following arithmetic scalar flags are affected during execution:

| | |
|---|---|
| N = | Current DN0 field from the SCR1. |
| Z = | Current DZ0 field from the SCR1. |
| V = | Current DV0 field from the SCR1. |
| C = | Current DC0 field from the SCR1. |
| DNx = | MSB of multi-cycle result. |
| DZx = | 1 if a zero from multi-cycle result is generated, 0 otherwise. |
| DVx = | 1 if a saturate from multi-cycle result is generated, 0 otherwise. |
| DCx = | Not Affected. |

For results that set both N=1 and Z=1, it is noted that the square root of a negative number is an imaginary number. When the operand is a negative number, this instruction produces a result as if the operand were a positive number, and it indicates that the result is imaginary by setting both the Negative (N) and Zero (Z) flags to 1. By way of example, imaginary numbers are frequently used in engineering to refer to a phase angle or phase value, the polar coordinate equivalent of Y-Axis values. Real numbers are used in polar coordinates associated with the X-Axis. Finally, FSQRT instruction 500 takes 8 cycles to operate.

Operation in accordance with the present invention may be illustrated as follows. The result of previously executed divide/square root unit instruction is copied from the DSQR 222 into the target register and the saved flags are copied from the DC, DN, DV, and DZ fields in the SCR1 to the CNVZ arithmetic flags in SCR0. The source operand is issued to the divide/square root module 216 in DSU 210 to produce a floating point square-root result after a multi-cycle iteration. When the result is complete, it is placed in DSQR 222 and the arithmetic flags generated are saved in the DN, DV, and DZ fields of the SCR1. The results and arithmetic flags can be obtained by issuing another divide/square root instruction to divide/square root module 216 in the same PE or SP (see DSQR instruction examples), or the results alone can be obtained by copying the DSQR to a compute register via a copy instruction (COPY). The copy instruction does not initiate or resynchronize a new multi-cycle operation. Both source registers are assumed to be in IEEE 754 compatible floating point format. The instruction 500 produces floating point (FP) results compatible with IEEE 754 standard. For additional discussion of ManArray floating point operations, see the Floating Point Operations, Saturation, and Overflow discussions herein. The instruction 500 executes in the DSU functional unit 210. The following table and example illustrate corner case floating-point square root (FSQRT) operations with zero, NAN and infinity values:

| Floating-Point Operand | | ManArray | |
|---|---|---|---|
| Sign | Value | Floating-Point Result | Arithmetic Flags |
| 0 | NAN or INF | $+1.9999..\times 2^{127}$ | V = 1, N = 0, Z = 0 |
| 1 | NAN or INF | $-1.9999..\times 2^{127}$ | V = 1, N = 1, Z = 0 |
| 1 | non-zero | $(ABS(Rx))^{1/2}$ | V = 0, N = 1, Z = 1 * |
| 0/1 | zero | +0 | V = 0, N = 0, Z = 1 |

A non-normalized result of an operation is flushed to zero.
ABS = Absolute Value

FSQRT EXAMPLE
!To obtain R2=sqrt(R0)
   FSQRT.PD.1FW R3, R0 ! Cycle-1, R3 gets DSQR result, square-root unit begins on R0

| | |
|---|---|
| <instr2> | ! Cycle-2 of FSQRT |
| <instr3> | ! Cycle-3 of FSQRT |
| <instr4> | ! Cycle-4 of FSQRT |
| <instr5> | ! Cycle-5 of FSQRT |
| <instr6> | ! Cycle-6 of FSQRT |
| <instr7> | ! Cycle-7 of FSQRT |
| <instr8> | ! Cycle-8 of FSQRT, DSQR gets result at the end of this cycle |

FSQRT.PD.1FW R2, R3 ! R2 gets DSQR (FSQRT R0), square-root unit begins on R3

It is noted that the instructions, <instr2> through <instr8>, represent independent concurrently executing instructions that operate while the multi-cycle execution is occurring.

Floating Point Reciprocal

FIGS. 6A and 6B illustrate aspects of a presently preferred encoding of a floating point reciprocal (FRCP) instruction 600 and a syntax and operation table 610 for that instruction, respectively. It is noted for the instruction format for instruction 600 of FIG. 6A that in the first cycle of execution the CNVZ flags and F0-F1 ACF flags are made available to the next instruction in the pipeline, but are actually written to SCR0 on the second execution cycle. This operation is similar to how all single-cycle arithmetic instructions operate. Additionally, the following table lists the arithmetic scalar flags affected during execution:

| | |
|---|---|
| N = | Current DN0 field from the SCR1. |
| Z = | Current DZ0 field from the SCR1. |
| V = | Current DV0 field from the SCR1. |
| C = | Current DC0 field from the SCR1. |
| DNx = | MSB of multi-cycle result. |
| DZx = | 1 if a zero from multi-cycle result is generated, 0 otherwise. |

-continued

DVx = 1 if a saturate from multi-cycle result is generated, 0 otherwise.
DCx = Not Affected.

Further, the FRCP instruction 600 takes 8 cycles to complete.

Operation in accordance with the present invention proceeds as follows. The result of a previously executed divide/square root unit instruction is copied from the DSQR 222 into the target register and the saved flags are copied from the DC, DN, DV, and DZ, fields in the SCR1 to the CNVZ arithmetic flags in SCR0. The source operand is issued to the divide/square root module 216 in DSU 210 to produce a floating point reciprocal (1/x) quotient after a multi-cycle iteration. When the result is complete, it is placed in DSQR 222, and the arithmetic flags generated are saved in the DN, DV, and DZ fields of the SCR1. The results and arithmetic flags can be obtained by issuing another divide/square root instruction to divide/square root module 216 in the same PE or SP (see DSQR instruction examples for further details), or the results alone can be obtained by copying the DSQR 222 to a compute register via a copy instruction (COPY). The copy instruction does not initiate or resynchronize a new multi-cycle operation. Both source registers are assumed to be in IEEE 754 compatible floating point format. The instruction 600 produces floating point (FP) results compatible with the IEEE 754 standard. For additional discussion of ManArray floating point operations, see the discussions of Floating Point operations, Saturation, and Overflow below. The instruction 600 executes in the DSU functional unit 210. The following table and example illustrate the comer case floating-point reciprocal operations with zero, NAN and infinity values:

| Floating-Point Operand | | ManArray | |
|---|---|---|---|
| Sign | Value | Floating-Point Result | Arithmetic Flags |
| 0 | NAN or INF | +0 | V = 1, N = 0, Z = 1 |
| 1 | NAN or INF | +0 | V = 1, N = 0, Z = 1 |
| 0/1 | zero | +1.9999..x $2^{127}$ | V = 1, N = 0, Z = 0 |

A non-normalized result of an operation is flushed to zero.

FRCP EXAMPLE
!To obtain R2 =R0/R1
  FRCP.PD.1FW R3, R0, R1 ! Cycle-1, R3 gets DSQR result, divide unit begins on R0/R1

<instr2> ! Cycle-2 of FRCP
<instr3> ! Cycle-3 of FRCP
<instr4> ! Cycle-4 of FRCP
<instr5> ! Cycle-5 of FRCP
<instr6> ! Cycle-6 of FRCP
<instr7> ! Cycle-7 of FRCP
<instr8> ! Cycle-8 of FRCP, DSQR/MODR gets result at the end of this cycle FRCP.PD.1FW R2, R3, R4 ! R2 gets DSQR (FRCP R0/R1), divide unit begins on R3/R4

It is noted that the instructions, <instr2> through <instr8>, represent independent concurrently executing instructions that operate while the multi-cycle execution is occurring.

Floating Point Reciprocal Square Root

FIGS. 7A and 7B illustrate aspects of a presently preferred encoding of a floating point reciprocal square root (FRSQRT) instruction 700 and a syntax and operation table 710 for that instruction, respectively. It is noted for instruction 700 that in the first cycle of execution the CNVZ flags and F0-F1 ACF flags are made available to the next instruction in the pipeline, but are actually written to SCR0 on the second execution cycle. This operation is similar to how all single-cycle arithmetic instructions operate. Additionally, the following table lists the arithmetic scalar flags affected during execution:

N = Current DN0 field from the SCR1.
Z = Current DZ0 field from the SCR1.
V = Current DV0 field from the SCR1.
C = Current DC0 field from the SCR1.
DNx = MSB of multi-cycle result.
DZx = 1 if a zero from multi-cycle result is generated, 0 otherwise.
DVx = 1 if a saturate from multi-cycle result is generated, 0 otherwise.
DCx = Not Affected.

It is further noted for results that set both N=1 and Z=1 that the square root of a negative number is an imaginary number. When the operand is a negative number, this instruction produces a result as if the operand were a positive number, and it indicates that the result is imaginary by setting both the negative (N) and zero (Z) flags to 1. By way of example, imaginary numbers are frequently used in engineering to refer to a phase angle or phase value, the polar coordinate equivalent of Y-Axis values. Real numbers are used in polar coordinates associated with the X-Axis. Finally, the FRSQRT instruction 700 takes 16 cycles to complete operation.

Operation in accordance with the present invention proceeds as follows. The result of a previously executed divide/square root unit instruction is copied from the DSQR 222 into the target register and the saved flags are copied from the DC, DN, DV, and DZ fields in the SCR1 to be utilized as the CNVZ arithmetic flags. The source operand is issued to the divide/square root module 216 in DSU 210 to produce a floating point reciprocal square-root result after a multi-cycle iteration. When the result is complete, it is placed in DSQR 222, and the arithmetic flags generated are saved in the DN, DV, and DZ fields of the SCR1. The results and arithmetic flags can be obtained by issuing another divide/square root instruction to divide/square root module 216 in the same PE or SP (see DSQR instruction examples), or the results alone can be obtained by copying the DSQR 222 to a compute register via a copy instruction (COPY). The copy instruction does not initiate or resynchronize a new multi-cycle operation. Both source registers are assumed to be in IEEE 754 compatible floating point format. The instruction 700 produces floating point (FP) results compatible with IEEE 754 standard. For additional discussion of ManArray floating point operations, see the discussions of Floating Point operations, Saturation, and Overflow below. The instruction 700 executes in the DSU functional unit 210. The following table and example illustrate the comer case floating-point reciprocal square root operations with zero, NAN and infinity values.

| Floating-Point Operand | | ManArray | |
|---|---|---|---|
| Sign | Value | Floating-Point Result | Arithmetic Flags |
| 0 | NAN or INF | +0 | V = 1, N = 0, Z = 1 |
| 1 | NAN or INF | +0 | V = 1, N = 0, Z = 1 |
| 1 | non-zero | $1/(ABS(Rx))^{1/2}$ | V = 0, N = 1, Z = 1 * |
| 0/1 | zero | $+1.9999..\times 2^{127}$ | V = 1, N = 0, Z = 0 |

A non-normalized result of an operation is flushed to zero.
ABS = Absolute Value

FRSQRT EXAMPLE

!To obtain R2=1/sqrt(R0)
  FRSQRT.PD.1FW R3, R0 ! Cycle-1, R3 gets DSQR result, square-root unit begins on R0

| <instr2> | ! Cycle-2 of FRSQRT |
| <instr3> | ! Cycle-3 of FRSQRT |
| ... | |
| <instr15> | ! Cycle-15 of FRSQRT |
| <instr16> | ! Cycle-16 of FRSQRT, DSQR gets result at the end of this cycle |

FRSQRT.PD.1FW R2, R3 ! R2 gets DSQR (FRSQRT R0), square-root unit begins on R3

It is noted that the instructions, <instr2> through <instr16>, represent independent concurrently executing instructions that operate while the multi-cycle execution is occurring.

Floating Point Operation, Saturation and Overflow

ManArray Floating Point operation constitute a subject of the IEEE 754 (1) basic 32 bit format single floating point data type, as shown in encoding format table 800 of FIG. 8.

The IEEE 754 Basic Standard provides for the numerical representations shown in the lefthand portion of the table below:

| Sign | Exponent, e | Fraction | Represents IEEE | ManArray output results | CNVZ Flags |
|---|---|---|---|---|---|
| s = 0 | $e = E_{min} - 1$ | $f = 0$ | +0 | +0 | Z = 1, N = 0 |
| s = 1 | $e = E_{min} - 1$ | $f = 0$ | -0 | Flushed to +0 (s = 0) | Z = 1, N = 0 |
| — | $e = E_{min} - 1$ | $f \neq 0$ | $\pm 0.f \times 2^{Emin}$ | Flushed to +0 (s = 0) | Z = 1, N = 0 |
| — | $E_{min} \geq e \geq E_{max}$ | — | $1.f \times 2^{e-127}$ | $1.f \times 2^{e-127}$ | N = s |
| — | $e = E_{max + 1}$ | $f = 0$ | $\pm \alpha$ | Clamped to $\pm 1.f_{max} \times 2^{Emax}$ | V = 1, N = s |
| — | $e = E_{max + 1}$ | $f \neq 0$ | NaN | Clampled to $\pm 1.f_{max} \times 2^{Emax}$ | V = 1, N = s |

Values shown illustrate some differences between the IEEE 754 standard and the exemplary ManArray implementation, shown in the right two columns. The ManArray floating point instruction FDIV 400, FSQRT 500, FRCP 600 and FRSQRT 700 produce result compatible with the IEEE 754 standard as shown above. ManArray floating point operation produce outputs within a range of $-2^{128}<value<+2^{128}$. ManArray floating point values approach zero such that the smallest non-zero positive value produced is $2^{-126}$, the largest negative value is $-2^{-26}$. Positive and negative infinity, "Not A Number" (NAN), negative zero representation, and non-normalized fractional values will not be produced (see table above). Source register are assumed to be in IEEE 754 floating point compatible format. It is noted that other forms of numerical processing, such as multi-cycle operation on integer values, are fully supported by this invention.

The IEEE 754 standard referred to above is more fully referred as follows: ANSI/IEEE Standard 754–1985, IEEE Standard for Binary Floating-Point Arithmetic, 1985 by The Institute of Electrical and Electronics Engineers, Inc. , New York, N.Y. This standard is incorporated by reference herein in its entirety. Further details of such operation are found, for example, in *Computer Architecture A Quantitative Approach* (2nd Ed.) by David A. Patterson and John L. Hennessy, 1990, 1996 by Morgan Kaufmann Publishers, Inc. at Page A-14, and U.S. Provisional applicataion Ser. No. 60/140,425 entitled "Methods and Apparatus for Parallel Processing Utilizing a Manifold Array (ManArray) Architecture and Instruction Syntax" and filed Jun. 22, 1999, and U.S. Application Ser. No. 09/599980 entitled "Methods and Apparatus for Parallel Processing Utilizing a Manifold Array (ManArray) Architecture and Instruction Syntax"and filed on Jun. 22, 2000 for instruction references for DIV, FDIV, FSQRT, FRCP, and FRSQRT and ManArray floating point reference documentation contained therein which is also incorporated by reference herein.

While the present invention has been disclosed in the context of various aspects of presently preferred embodiments, it will be recognized that the invention may be suitably applied to other environments and applications consistent with the claims which follow.

We claim:

1. A method for initiating and resynchrohizing multi-cycle single instruction multiple data stream (SIMD) instruction comprising the steps of:

executing a first multi-cycle instruction which takes more than a predetermined number of cycles to complete within a complex execution module, but independently of other module short instruction word (SIW) instructions; and storing the results of the multi-cycle instruction in a separate multi-cycle instruction result register at completion of its operation.

2. The method of claim 1 wherein the predetermined number of cycles is two.

3. The method of claim 1 further comprising the step of:
   upon receiving a second multi-cycle instruction which takes more than the predetermined number of cycles to complete, transferring the contents of the multi-cycle instruction result register to a target register specified by the second multi-cycle instruction.

4. The method of claim 1 further comprising the steps of:
   executing an instruction which takes the predetermined number of cycles or less to complete; and
   writing result data for the instruction to a compute register file (CRF) upon completion.

5. The method of claim 1 wherein the complex execution module is a divide and square root unit for separate execution of one or more of the following multi-cycle instructions: dual 16-bit integer divide, 32-bit integer divide, single precision floating point divide, single precision floating point reciprocal, single precision floating point square root, and single precision floating point reciprocal square root.

6. The method of claim 5 wherein the instruction latencies of the one or more instructions are taken into account when scheduling new instruction dispatching.

7. The method of claim 3 further comprising the step of:
utilizing the multi-cycle instruction which takes more than a predetermined number of cycles to cause a single cycle transfer from a separate result register to a target register as specified by the second multi-cycle instruction.

8. Apparatus for initiating and resynchronizing multi-cycle single instruction multiple data stream (SIMD) instruction comprising the steps of:
means for executing a first multi-cycle instruction which takes more than a predetermined number of cycles to complete within complex execution module, but independently of other module short instruction word (SIW) instructions; and
means for storing the results of the multi-cycle instruction in a separate multi-cycle instruction result register at completion of its operation.

9. The apparatus of claim 8 further comprising the step of:
means for transferring the contents of the multi-cycle instruction result register to a target register specified by a second multi-cycle instruction, upon receiving a second multi-cycle instruction which takes more than the predetermined number of cycles to complete.

10. The apparatus of claim 9 further comprising
means for causing a single cycle transfer from a separate result register to a target register in response to the first multi-cycle instruction which takes more than a predetermined number of cycles as specified by the second multi-cycle instruction.

11. The apparatus of claim 8 further comprising:
means for executing an instruction which takes the predetermined number of cycles or less to complete; and
means for writing result data for the instruction to a compute register file (CRF) upon completion.

12. The apparatus of claim 8 wherein the complex execution module is a divide and square root unit for separate execution of one or more of the following multi-cycle instructions: dual 16-bit integer divide, 32-bit integer divide, single precision floating point divide, single precision floating point reciprocal, single precision floating point square root, and single precision floating point reciprocal square root.

13. The apparatus of claim 12 wherein the instruction latencies of the one or more instructions are taken into account when scheduling new instruction dispatching.

14. The apparatus of claim 8 wherein the complex execution module is a divide and square root unit comprising a divide and square root result register and a divide and square root module.

15. The apparatus of claim 14 further comprising a MODR register for storing truncated remainder results.

* * * * *